US006815857B2

United States Patent
Akatsu

(10) Patent No.: US 6,815,857 B2
(45) Date of Patent: Nov. 9, 2004

(54) ELECTRICAL ROTATING MACHINE HAVING TWO ROTORS DRIVEN BY MEANS OF COMPOUND CURRENT

(75) Inventor: Kan Akatsu, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/476,174

(22) PCT Filed: Mar. 28, 2003

(86) PCT No.: PCT/JP03/03919

§ 371 (c)(1),
(2), (4) Date: Nov. 3, 2003

(87) PCT Pub. No.: WO03/084032

PCT Pub. Date: Oct. 9, 2003

(65) Prior Publication Data

US 2004/0119373 A1 Jun. 24, 2004

(30) Foreign Application Priority Data

Apr. 1, 2002 (JP) .................................... 2002-098636

(51) Int. Cl.[7] .............................................. H02K 16/02
(52) U.S. Cl. ..................................... 310/114; 310/112
(58) Field of Search ...................... 310/112–114, 261, 310/254

(56) References Cited

U.S. PATENT DOCUMENTS

| 4,381,482 A | * | 4/1983 | Doniwa ....................... 318/816 |
| 4,387,335 A | * | 6/1983 | Fisher et al. ................... 322/32 |
| 4,626,752 A | * | 12/1986 | Fujisaki et al. ............. 318/254 |
| 6,049,152 A | * | 4/2000 | Nakano ........................ 310/114 |
| 6,211,597 B1 | | 4/2001 | Nakano |
| 6,373,160 B1 | | 4/2002 | Schrödl |
| 6,710,492 B2 | * | 3/2004 | Minagawa ................... 310/113 |
| 2003/0052564 A1 | * | 3/2003 | Wilsdorf ....................... 310/179 |

FOREIGN PATENT DOCUMENTS

| EP | 1 158 651 A2 | 11/2001 |
| EP | 1 237 262 A1 | 9/2002 |
| JP | 11-356015 A | 12/1999 |

* cited by examiner

*Primary Examiner*—Thanh Lam
(74) *Attorney, Agent, or Firm*—Foley & Lardner LLP

(57) ABSTRACT

In an electrical rotating machine, two rotors are provided, each rotor has a plurality of permanent magnets along its peripheral direction thereof, arranged coaxially with the other rotor, and is driven by means of a compound current supplied to stator coils and a single stator has a plurality of stator coils through which the compound current is caused to flow, one of the rotors exhibiting a forward saliency characteristic and the other rotor exhibits a reverse saliency characteristic.

16 Claims, 7 Drawing Sheets

1A

1A

US 6,815,857 B2

ELECTRICAL ROTATING MACHINE HAVING TWO ROTORS DRIVEN BY MEANS OF COMPOUND CURRENT

TECHNICAL FIELD

The present invention relates to an electrical rotating machine and, more particularly, relates to the electrical rotating machine in which inner rotor and outer rotor are coaxially arranged with a single stator sandwiched therebetween (viz., with a single stator as a center between the inner rotor and outer rotor), each of the inner and outer rotors having a plurality of permanent magnets in a circumferential direction thereof and being driven by means of a compound current supplied to flow through stator coils.

BACKGROUND ART

A Japanese Patent Application First Publication No. Heisei 11-356015 published on Dec. 24, 1999 exemplifies a previously proposed rotating machine having a three layer structure described above.

Generally, it is well known that, in a permanent magnet synchronous rotating machine, a rotor is structured to exhibit a reverse saliency (a reverse saliency characteristic) so that a reluctance torque can be utilized and a magnet quantity (which corresponds to the number of pole pairs that the rotor has) can be reduced. The reverse saliency characteristic exhibited on the rotor structure can be achieved by modifying the permanent magnet synchronous rotating machine into a permanent magnet buried type (an interior permanent magnet) rotating machine. Hence, a normally available rotating machine having a single rotor and a single stator generally provides the rotor with the reverse saliency characteristic. It may be considered to be a general practice that, even in the rotating machine having the three-layer structure described in the above-described Japanese Patent Application First Publication, both of the two rotors are, respectively, provided with the reverse saliency characteristics.

DISCLOSURE OF THE INVENTION

However, in the rotating machine having two rotors described in the BACKGROUND OF THE INVENTION, both interlinkage magnetic fluxes of the inner rotor and outer rotor pass through the single stator. Therefore, if both of the two rotors have the reverse saliency characteristics, q-axis interlinkage magnetic fluxes of the inner rotor and the outer rotor pass through the single stator. Therefore, if both rotors have the reverse saliency characteristics, q-axis interlinkage magnetic flux $\lambda_q$ caused by q-axis inductance $L_q$ is increased so that a stator interlinkage magnetic flux is saturated. Thus, an output (magnetic flux) density cannot be raised. If output (magnetic flux) densities are tried to be increased, an area of the stator becomes large.

It is, therefore, an object of the present invention to provide an electrical rotating machine in which the two rotors are coaxially arranged so that a miniaturization of the stator is made possible, if the quantity of buried magnets (the number of magnets) is the same, and a reduction of the quantity of buried magnets is made possible if the stator structure is left unchanged.

According to one aspect of the present invention, there is provided an electrical rotating machine, comprising: at least two rotors, each of the rotors having a plurality of permanent magnets along its circumferential direction thereof and arranged coaxially with the other rotor and being driven by means of a compound current supplied to stator coils; and a single stator having a plurality of stator coils through which the compound current is caused to flow, one of the rotors exhibiting a forward saliency characteristic and the other rotor exhibiting a reverse saliency characteristic.

According to another aspect of the present invention, there is provided a method applicable to an electrical rotating machine, the electrical machine comprising: at least two rotors, each rotor having a plurality of permanent magnets along its circumferential direction thereof, arranged coaxially with the other rotor, and being driven by means of a compound current supplied to stator coils; and a single stator having a plurality of stator coils through which the compound current is caused to flow, the method comprising: exhibiting a forward saliency characteristic for one of the rotors; and exhibiting a reverse saliency characteristic for the other rotor.

This disclosure of the invention does not necessarily describe all necessary features so that the invention may also be a sub-combination of these described features.

BEST MODE FOR CARRYING OUT THE INVENTION

Reference will hereinafter be made to the drawings in order to facilitate a better understanding of the present invention.

Figure 1A:
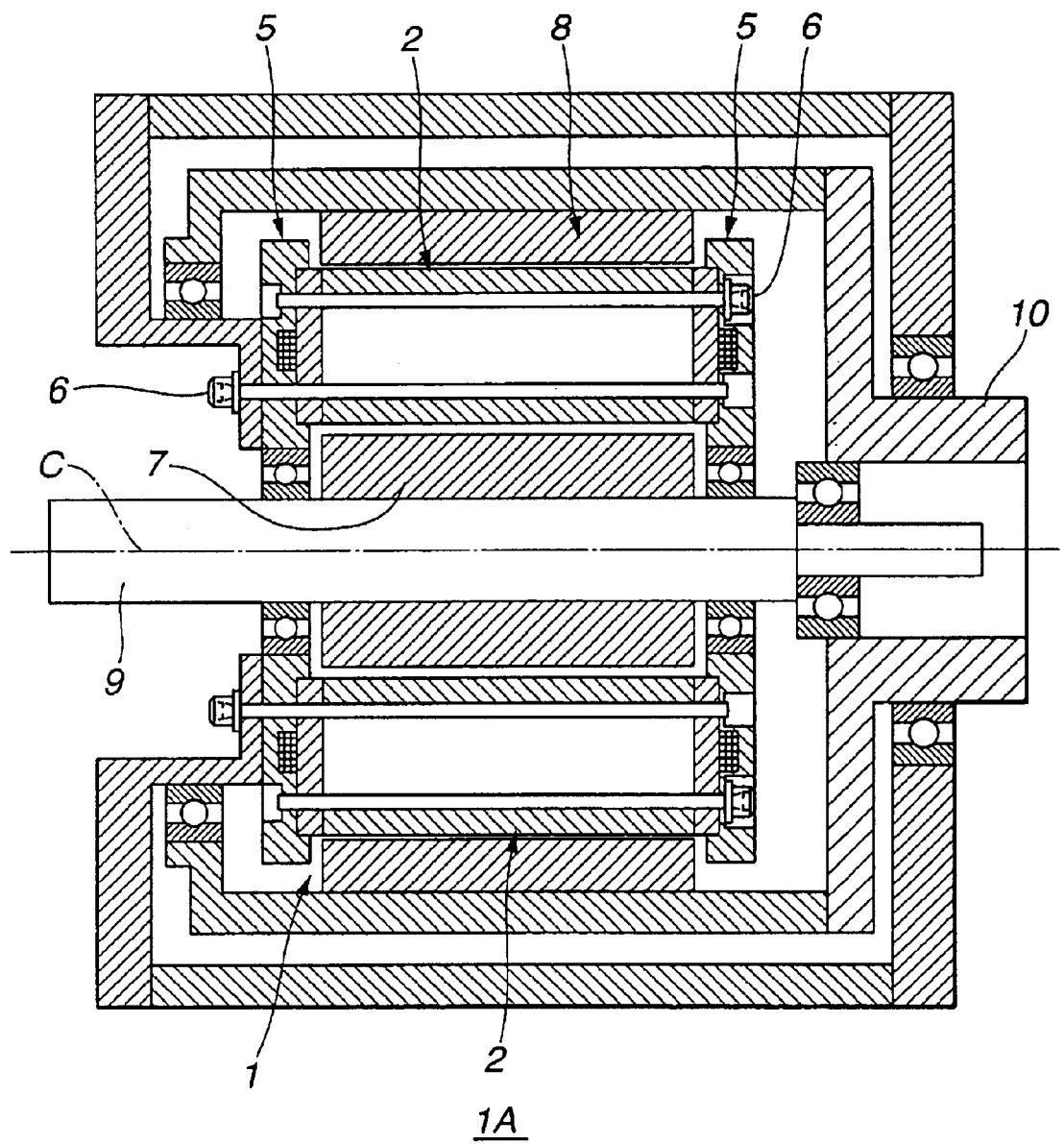
FIG. 1A is a cross sectional view representing a structure of an electrical rotating machine in a first preferred embodiment according to the present invention.

FIG. 1A shows a cross sectional view representing a structure of an electrical machine in a first preferred embodiment according to the present invention.

The rotating machine shown in FIG. 1A has a multiplex rotor structure in which an inner rotor 7 attached onto an inner rotor shaft 9, a stator 1, and an outer rotor 8 attached onto an outer rotor shaft 10 concentrically on a center axis line C of inner rotor shaft 9 (which corresponds to a center axis line of the rotating machine) in this order from an inside of the rotating machine. Stator 1 interposed between two rotors of outer rotor 8 and inner rotor 7 includes a stator core 2 and a bracket 5 supporting stator core 2 so as to grasp stator core 2 from both sides in the axial direction. Bolts 6 penetrate through holes provided on bracket 5 and stator core 2. These members are fixed by means of bolts 6 to form a whole stator 1. Stator core 2 is divided into a plurality of stator pieces in a peripheral direction of stator 1. Each stator piece is formed by laminating stator steel plates by a plurality of sheets. In addition, a single coil is wound around each stator piece. A plurality of permanent magnets are buried in each rotor 7 and 8 at equal intervals in its peripheral direction.

In order to represent the permanent magnet synchronous rotating machine (motor), two coordinate systems are mainly used. One is a static coordinate system ($\alpha$-$\beta$ coordinate system). The other is a rotating coordinate system (or called, a rotating reference frame) (d-q coordinate system). In the static coordinate system, axes are set with stator as a reference and the axes are not moved even if the rotating machine is operated. On the other hand, in the rotating coordinate system, the axes are set with one of the rotors as a reference. As viewed from the static coordinate system, the rotating coordinate system is moved in synchronization with the rotor. In general, with q axis set as an axis of the magnet and q axis is set to be an axis deviated from d axis by an electrical angle of 90 degrees. It is noted that the electrical angle is a mechanical angle multiplied by the number of pole pairs and is a rotating angle of the magnetic flux. In other words, in the case of two pole pairs (four poles, the number of magnets has four), a point deviated by the mechanical angle of 45 degrees from d axis, viz., a point deviated by the electrical angle of 90 degrees is q axis. d axis is set to meet its reference with the magnet and, hence, represents a non-load magnetic flux axis.

Since q axis is orthogonal to d axis, a torque is developed when a current is caused to flow through q axis (the current is caused to flow through the stator when a rotor opposed against the stator is on q axis. This is a Fleming's left hand rule. Hence, if no current is caused to flow, the magnetic flux is developed only on d axis. If q-axis current is caused to flow, the magnetic flux is also developed on q axis. Then, since the magnetic flux is equal to an inductance times a current, q-axis magnetic flux is expressed as $L_q \times I_q$, wherein $L_q$ denotes a q-axis inductance and $I_q$ denotes a q-axis current.

Figure 2:
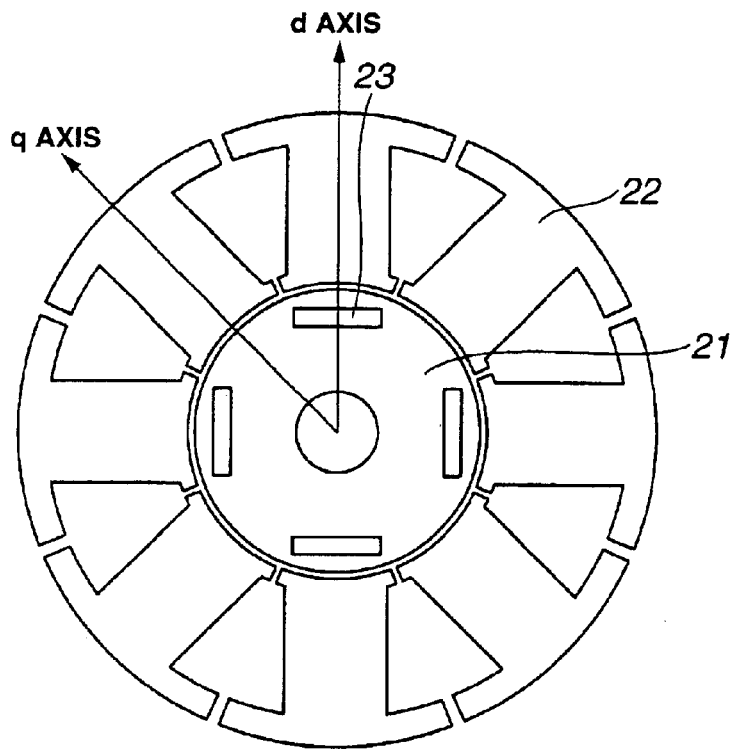
FIG. 2 is an explanatory rough view representing a d axis and a q axis (rotating coordinate system or, so-called, a rotational reference frame) in a normally available rotating machine having one rotor and one stator.

FIG. 2 shows an explanatory view for explaining d axis and q axis in an ordinarily available one rotor rotating machine.

The rotating machine includes: a rotor 21 and a stator 22. Permanent magnets 23 are buried into at each equal interval of mechanical angle of 90 degrees into an interior of rotor 21. As shown in FIG. 2, the above-described d axis and q axis are defined. Hence, in a case of the interior permanent magnet rotating machine, a permeability of a single magnet is substantially equivalent to air. Hence, d-axis inductance $L_d$ is smaller than q-axis inductance $L_q$. In general, the rotor having such a rotor characteristic as $L_d < L_q$ is called exhibiting a reverse saliency characteristic. On the other hand, in a case where $L_d \geq L_q$, exhibiting a forward saliency characteristic is defined in the whole specification.

The forward saliency characteristic is theoretically explained. An equation of torque of the permanent magnet rotating machine is as follows: $T_e = P(\phi_d + (L_d - L_q)i_d)i_q$ - - - (1). In equation (1), P denotes the number of poles, $\phi_d$ denotes the non-load magnetic flux (magnet flux), $i_d$ denotes the d-axis current, and $i_q$ denotes the q-axis current. $L_d$ is smaller than q-axis inductance $L_q$. A second term of $(L_d - L_q)i_d i_q$ in equation (1) corresponds to the reluctance torque. Hence, if this reluctance torque makes it possible to develop a torque while field-weakening is carried out with a negative $i_d$ in the case of the reverse saliency characteristic. On the other hand, the magnetic fluxes interlinked across this stator are $$\lambda_d = \phi_d + L_d i_d \quad (2)$$

$$\lambda_q = L_q i_q \quad (3)$$

$$\lambda = \sqrt{\lambda_d^2 + \lambda_q^2} \quad (4).$$

When a large torque is developed, $i_q$ is increased. When $L_q$ is increased, $\lambda_q$ is increased. Consequently, $\lambda$ is increased.

Next, a compound current which is caused to flow from an inverter (not shown) to each stator coil wound on stator piece of stator 1 shown in FIG. 1A will be explained below.

Figure 1B:
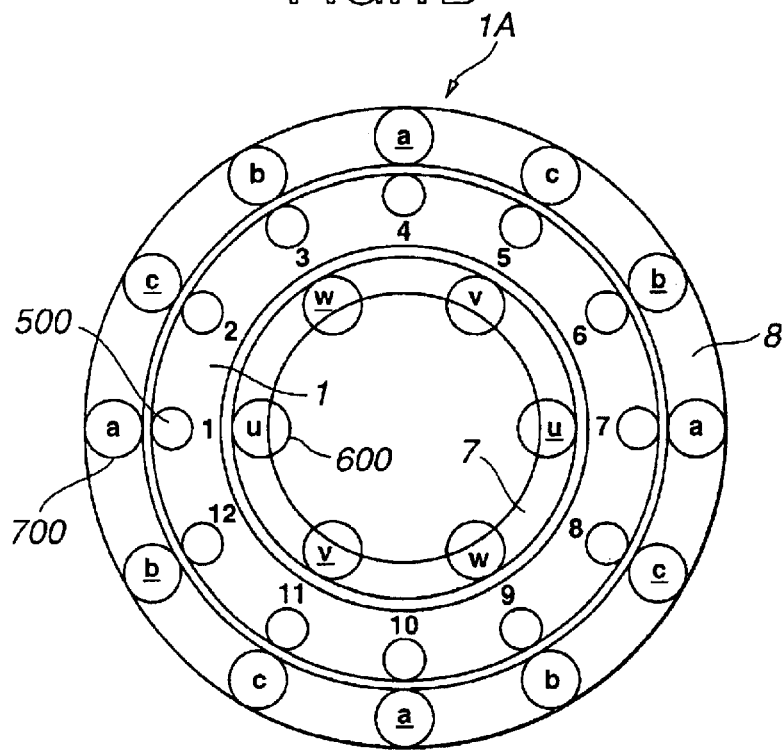
FIGS. 1B and 1C are explanatory view of an arrangement of magnetic poles of inner rotor and outer rotor and stator coils for explaining a flow of a compound current.
Figure 1C:
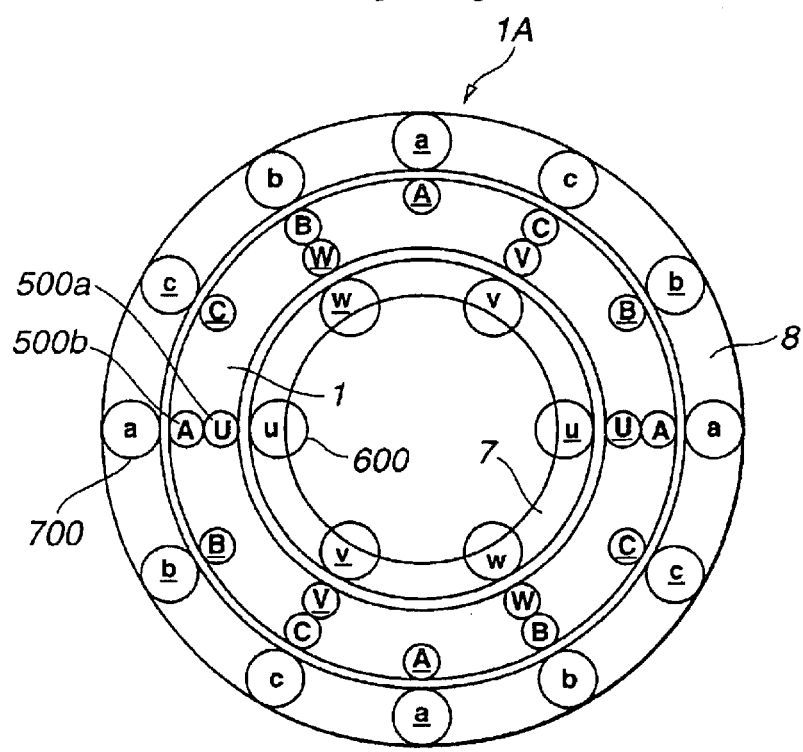
Figure 5:
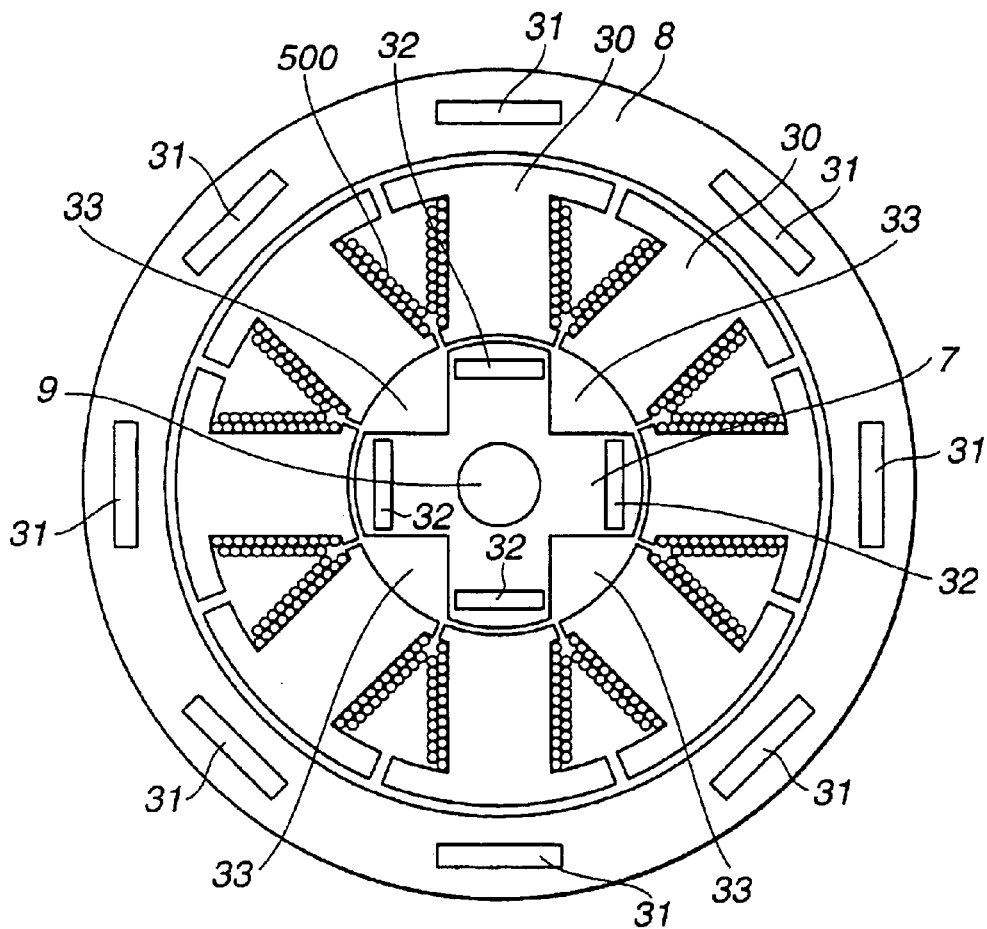
FIG. 5 is a cross sectional view of an electrical rotating machine in the first preferred embodiment according to the present invention shown in FIG. 1A.

FIGS. 1B and 1C show rough cross sectional views of the electrical rotating machine 1A shown in FIG. 1A. It is noted that FIGS. 1B and 1C are prepared for explaining the compound current and FIG. 5 shows the actual across sectional view vertically cut away along a center line axis in the first embodiment of the rotating machine according to the present invention as will be described later.

As shown in FIG. 1B, stator 1 has an inner circumferential wall and an outer circumferential wall. Inner rotor 7 is arranged around the inner circumferential side of stator 1 with a predetermined gap therebetween. Outer rotor 8 is arranged around the outer periphery of stator 2 with a predetermined gap therebetween. (This is, often, called a three-layer structure). Inner and outer rotors 7 and 8 are disposed on the same axis of rotation so as to enable a rotation of an outer frame (not shown in FIGS. 1B and 1C). Since, in this case, inner and outer rotors 7 and 8 are located at an inside of stator 1 and an outside thereof, it is necessary to arrange coils 500 along stator 1 in order to cause a current generating a rotating (magnetic) field to flow into coils 500 for each of inner and outer rotors 7 and 8. For example, an arrangement of twelve coils 500 shown in FIG. 1B is obtained as a result of consideration by referring to FIG. 1C. Hence, electrical rotating machine 1A shown in FIG. 1C will, at first, be explained.

Referring to FIG. 1B, in order to cause the current (original current) to generate the rotating field for inner rotor 7 (three-phase alternating current), three couples of coils 500a (U phase, V phase, and W phase coils) are arranged at equal intervals to one another along the inner circumferential side of stator 1. Then, in order to cause the current to generate the rotating field for outer rotor 8 (three-phase alternating current), three couples of coils (A phase, B phase, and C phase coils) are arranged at equal intervals to one another along the outer circumferential side of stator 1. It is noted that a total number (twelve) of the outer circumferential side coils 500b of stator 1 is twice the total number (six) of the inner circumferential side coils 500a. Three couples of induction coils 600 and 700 are arranged on respective inner and outer rotors 7 and 8 so as to oppose against each of inner and outer circumferential side coils 500a and 500b of stator 1. That is to say, the outer circumferential side of inner rotor 7 is provided with the same number of induction coils (six) as the inner circumferential side coils 500a of stator 1 (u phase, v phase, and w phase coils) at equal intervals to one another and the inner circumferential side of outer rotor 8 is provided with the same number (twelve) coils of induction coils (a phase, b phase, and c phase coils) as outer circumferential side coil 500b are arranged at equal intervals to one another along the inner circumferential side of outer rotor 8. It is noted that, in order to facilitate the understanding of a corresponding relationship on each phase of the coils between the stator and rotors, lower case alphabets are assigned to induction coils 600 and 700 of each rotor and upper case alphabets are assigned to stator coils 500a and 500b. It is noted that, in order to facilitate the understanding of a corresponding relationship on each phase of the coils between the stator and rotor, lower case alphabets are assigned to induction coils 600 and 700 of each rotor and upper case alphabets are assigned to stator coils 500a and 500b. Each underline attached below the alphabets in FIGS. 1B and 1C means that the current is caused to flow in an opposite direction to the normal direction. For example, suppose that, if a current is caused to flow through two A phase coils spaced apart from each other by 180 degrees in a direction of a rear side of a sheet of paper as viewed from FIG. 1C, the current is caused to flow through two A phase coils toward a direction of a front side of the sheet of paper (as viewed from FIG. 1C).

In this way, when the three-phase alternating current is caused to flow with two stator coils 500a and 500b arranged as shown in FIG. 1C, the current flowing through inner circumferential side coil 500a provides the rotating field (an inner rotating magnetic field) for induction coils 600 of inner rotor 7 and the current flowing through outer circumferential side coil 500b provides the rotating field (an outer rotating magnetic field) for induction coils 700 of outer rotor 8. At this time, the number of pair of poles of inner rotor 7 is 1, the number of pair of poles of outer rotor 8 is 2 so that an induction motor having a ratio of the number of pair of poles of two rotors 2:1 is structured. It is noted that, although, as one example, the induction motor has been described. The present invention is applicable to a sinusoidal wave driven motor, for example, a synchronous motor and an induction synchronous motor.

It is noted that three couples of coils 500a (U, V, W), 500b (A, B, C) arranged on inner and outer circumferential sides of stator 1 are coils exclusively used for the respective inner and outer rotors 7 and 8 and it is necessary to provide two inverters that control the currents flowing into the respective exclusively used coils when the two exclusively used coils when the two exclusively used coils have been installed on stator 1. To cope with this double installations of the inverters, it is necessary to integrate two exclusively used coils when the two exclusively used coils have been installed on stator 1. In other words, to cope with this double installations of the inverters, it is necessary to integrate two exclusively used coils 500a and 500b into a single coil (common usable) as shown in FIG. 1B. Since, in FIG. 1C, two coils (A phase coil and U phase coil, B phase coil and W phase coil, C phase coil and V phase coil, A phase coil and U phase coil, and C phase coil and V phase coil), the compound currents $I_1$ through $I_{12}$ flowing through stator coil 500 shown in FIG. 1B when mutually compared with FIGS. 1B and 1C are expressed as follows:

$$I_1 = I_A + I_U$$

$$I_2 = I_C$$

$$I_3 = I_B + I_W$$

$$I_4 = I_A$$

$$I_5 = I_C + I_V$$

$$I_6 = I_B$$

$$I_7 = I_A + I_U$$

$$I_8 = I_C$$

$$I_9 = I_B + I_W$$

$$I_{10} = I_A$$

$$I_{11} = I_C + I_V$$

$$I_{12} = I_B \quad (5).$$

It is noted that, in equation (5), the underline attached below each phase current (for example, $\underline{I_C}$) denotes the current whose flow direction is opposite to no underlined current.

In this case, suppose that, since a load of coils flowing through the respective compound currents of $I_1, I_3, I_5, I_7, I_9,$ and $I_{11}$ are larger than the remaining coils through which the respective compound currents are caused to flow, the load is distributed to the remaining coils and the inner rotating field is formed together with the remaining coils.

For example, as contrasted FIG. 1B and FIG. 1C, a portion of the stator coil 500 in FIG. 1B to which attached numerals 1 and 2 are assigned corresponds to A phase coil A and C phase coil C from among the outer circumferential coils 500b in FIG. 1C and U phase coil U from among the inner circumferential coils 5a in FIG. 1C. In this case, suppose that the phase of U phase coil in FIG. 1C is slightly deviated in the clockwise direction of FIG. 1C and this slightly deviated phase coil is a new U' phase coil. At this time, a half of the current flowing through new U' phase coil is assigned to A phase coil A and C phase coil C in FIG. 5. The remaining portions of stator coil 500 shown in FIG. 1B are the similarly considered. Thus, another current setting can be achieved. That is to say, $$I_1 = I_A + (\tfrac{1}{2})I_{U'}$$

$$I_2 = I_C + (\tfrac{1}{2})I_{U'}$$

$$I_3 = I_B + (\tfrac{1}{2})I_{W'}$$

$$I_4 = I_A + (\tfrac{1}{2})I_{W'}$$

$$I_5 = I_C + (\tfrac{1}{2})I_{V'}$$

$$I_6 = I_B + (\tfrac{1}{2})I_{V'}$$

$$I_7 = I_A + (\tfrac{1}{2})I_{U'}$$

$$I_8 = I_C + (\tfrac{1}{2})I_{U'}$$

$$I_9 = I_B + (\tfrac{1}{2})I_{W'}$$

$$I_{10} = I_A + (\tfrac{1}{2})I_{W'}$$

$$I_{11} = I_C + (\tfrac{1}{2})I_{V'}$$

$$I_{12} = I_B + (\tfrac{1}{2})I_{V'} \quad (6).$$

Then, equation (6) may be replaced with an equation (3) described below:

$$I_1 = I_A + I\text{i}$$

$$I_2 = I_C + I\text{ii}$$

$$I_3 = I_B + I\text{iii}$$

$$I_4 = I_A + I\text{iv}$$

$$I_5 = I_C + I\text{v}$$

$$I_6 = I_B + I\text{vi}$$

$$I_7 = I_A + I\text{viii}$$

$$I_8 = I_C + I\text{viii}$$

$$I_9 = I_B + I\text{ix}$$

$$I_{10} = I_A + I\text{x}$$

$$I_{11} = I_C + I\text{xi}$$

$$I_{12} = I_B + I\text{xii} \quad (7).$$

In other words, current Ii through Ixii on each second term of a right side of equation (7) defines a twelve-phase current. This twelve-phase current can form the inner rotating field.

When the above-described current setting is carried out, two rotating fields of the inner and outer rotating fields are simultaneously generated although the coil 500 is the single coil structure as viewed from both rotors 7 and 8. Induction coil 600 of inner rotor 7 does not receive the rotating force from the outer rotating field and, on the other hand, induction coil 700 of outer rotor 8 does not receive the rotating force from the inner rotating field.

Next, in a case where the rotating machine is driven and inner and outer rotors are coaxially arranged (refer to FIG. 1B), the above-described magnetic flux λ is interlinked with a sum of magnetic flux λ1 of inner rotor 7 and magnetic flux λo of outer rotor 8. Therefore, magnetic flux λ exceeds a maximum interlinkage magnetic flux density of the stator. That is to say, a problem of a saturation of the stator occurs. It is well known that, when a current is caused to flow through a coil, a magnetic field is developed. This magnetic field causes the magnetic flux to be generated within the stator. This is caused by a stator material magnetized so that its molecules are directed in the same direction. However, even if a magnetic field equal to or higher than a certain constant value, the already direction aligned molecules are not aligned any more so that the magnetic flux density generated on stator reaches the top and this is called a saturation of the stator.

If the stator is saturated, the magnetic flux is not increased even if the current is caused to flow. Hence, the torque expressed as magnetic flux x current is not increased any more.

Hence, if the stator is saturated, the torque reaches the top and output density is not improved. In addition, since the magnetic flux is expressed as magnetic flux density x stator cross sectional area, the magnetic flux is also increased as the stator cross sectional area is increased even in a case where the magnetic flux is not raised any more with the saturation of stator. Hence, the torque is also increased.

Since, in a previously proposed electrical rotating machine, q-axis inductance $L_q$ is designed to be large when both rotors are designed to exhibit the reverse saliency characteristics, the q-axis magnetic flux becomes large. In a case where the rotating machine in which the two rotors are coaxially arranged, the magnetic fluxes of the two rotors pass through the single stator. Hence, in a case where one rotor outputs a large torque (large $I_q$), only this current (or this rotor magnetic flux) causes the stator magnetic flux to reach an allowable limit of a magnetic flux of the stator. Then, the stator is saturated, the other rotor cannot output the required torque (since the magnetic flux is not passed any more). In addition, although a field-weakening (d-axis current is caused to flow in a negative direction. The d-axis magnetic flux is expressed as: $\lambda_d = \phi_d + L_d \times I_d$. Thus, $\lambda_d$ is made smaller) is applied in order to reduce the magnetic flux and to output the reluctance torque, the effect of field-weakening is small (large $I_d$ is needed to be caused to flow) since $L_q$ is large but $L_d$ is small.

As described above, if both of the two rotors exhibit the reverse saliency characteristics, it is difficult to output large torque simultaneously from each of the two rotors.

To solve this problem, in the case of the rotating machine according to the present invention, the characteristics of both of the two rotors are designed to have such a characteristic that one of the rotors exhibits the forward saliency characteristic and the other rotor exhibits the reverse saliency characteristic. Thus, a required torque is satisfied while reducing the interlinkage magnetic flux.

Figure 3:
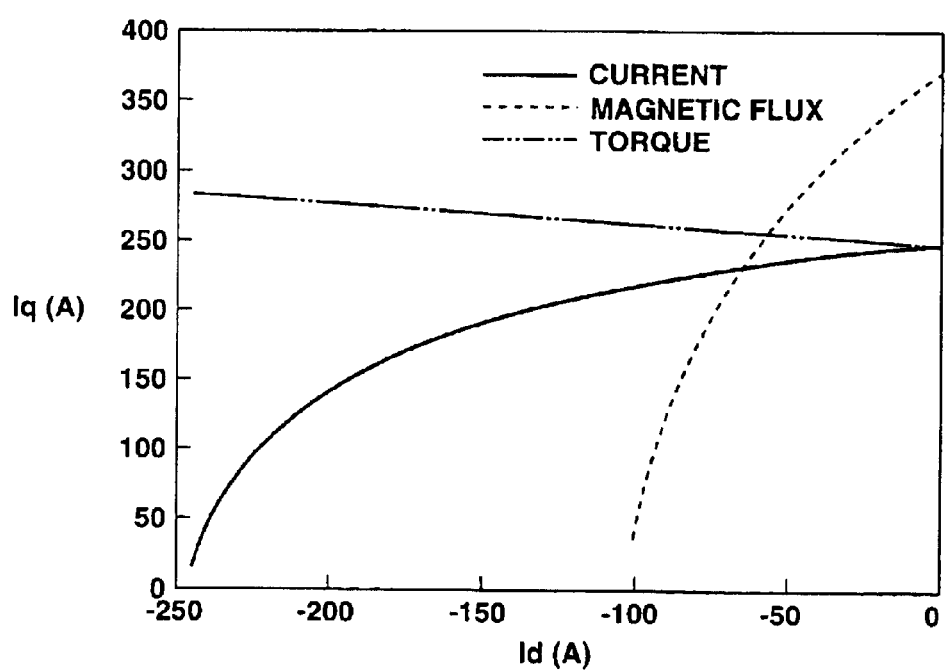
FIG. 3 is a characteristic graph representing a forward saliency characteristic.

FIG. 3 shows characteristic graph representing the forward saliency characteristic.

Figure 4:
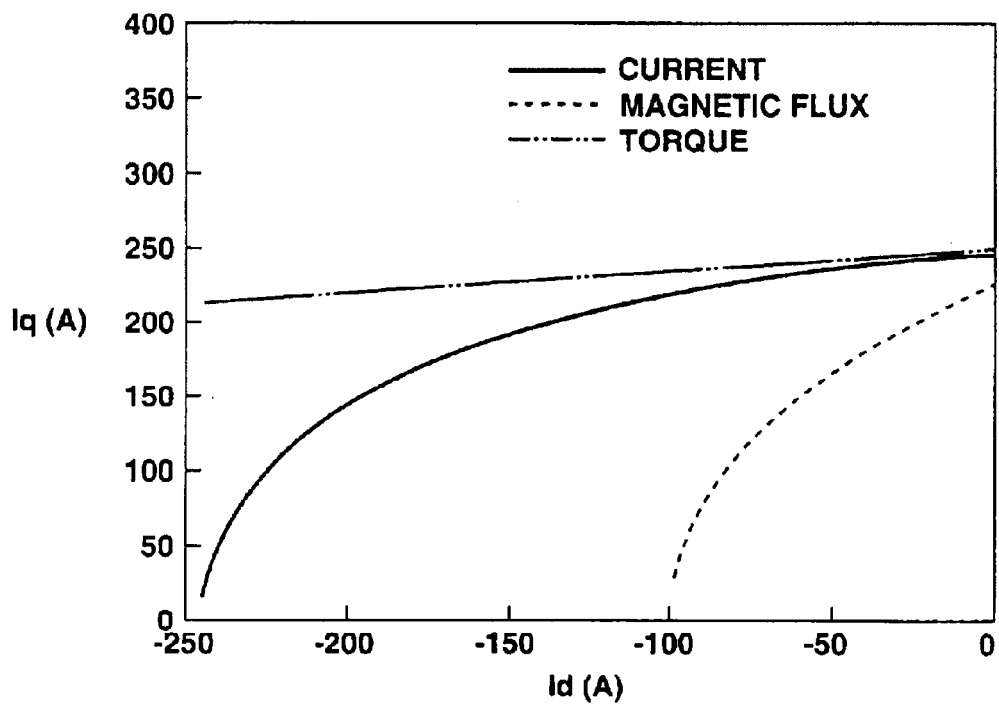
FIG. 4 is a characteristic graph representing a reverse saliency characteristic.

FIG. 4 shows a characteristic graph representing the reverse saliency characteristic.

In these graphs shown in FIGS. 3 and 4, each lateral axis denotes the d-axis current and each longitudinal axis denotes q-axis current. With $I_d$ and $I_q$ taken as parameters, equation (1) is expressed as a hyperbola (hyperbolic curve) and equation (4) is expressed as an ellipse.

In order to satisfy the required characteristic, it is necessary for the torque curve and current curve shown in FIGS. 3 and 4 to have an intersecting point. In addition, this intersecting point is located at an inside of a magnetic flux ellipse as shown in FIG. 3.

As shown by FIGS. 3 and 4, the forward saliency characteristic satisfies the above condition. However, the reverse saliency characteristic does not satisfy the above condition. In other words, the reverse saliency characteristic exceeds the allowable interlinkage magnetic flux density of the stator. This is the reason for one of the rotors to exhibit the forward saliency characteristic.

FIG. 5 shows a cross sectional view vertically cut with respect to the center line axis C in the first embodiment of the rotating machine according to the present invention shown in FIG. 1A. The same reference numerals shown in FIG. 5 as those shown in FIG. 1A designate the like elements. The details of bolt holes are omitted herein. Stator core 2 shown in FIG. 1A corresponds to a plurality of letter T-shaped stator pieces 30. A plurality of magnets 31 (eight poles in the case of FIG. 5) are buried into an interior of outer rotor 8. A plurality of magnets 32 are buried into inner rotor 7 (four poles in the case of FIG. 5). Each recess portion 33 is formed on inner rotor 7 to form a convex-and-recess structure on inner rotor 7. Stator coil is wound on each stator piece 30. It is noted that outer rotor 8 indicates the reverse saliency characteristic of the interior permanent magnet type, in this embodiment.

Figure 6:
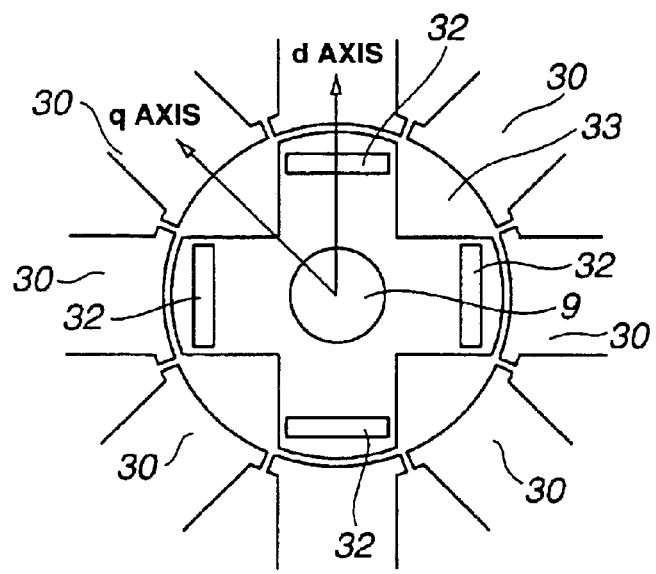
FIG. 6 is an expanded cross sectional view for explaining an inner rotor portion shown in FIG. 5.

FIG. 6 shows an expanded view of an inner rotor portion shown in FIG. 5. Suppose, in inner rotor 7 of FIG. 6, a magnet buried portion (d axis) is the convex portion, q axis running through recessed portion. Recess portion 33 as viewed from stator 1 becomes high reluctance due to a presence of air. Consequently, inductance $L_q$ is decreased. In this way, the forward saliency characteristic of inner rotor 7 is realized. In this case, as appreciated from FIG. 6, a shape of the rotor steel plate becomes simple so that a punching ability (or punching easiness) can be improved.

In addition, a mass of rotors due to a presence of each recess portion 33 is reduced and an iron loss, especially, an eddy current loss developed on inner rotor 7 is decreased. In addition, an air gap of each recess portion 33 is arranged aside of permanent magnet 32 buried in inner rotor 7. This leakage magnetic flux is reduced and the output torque is improved.

Figure 7:
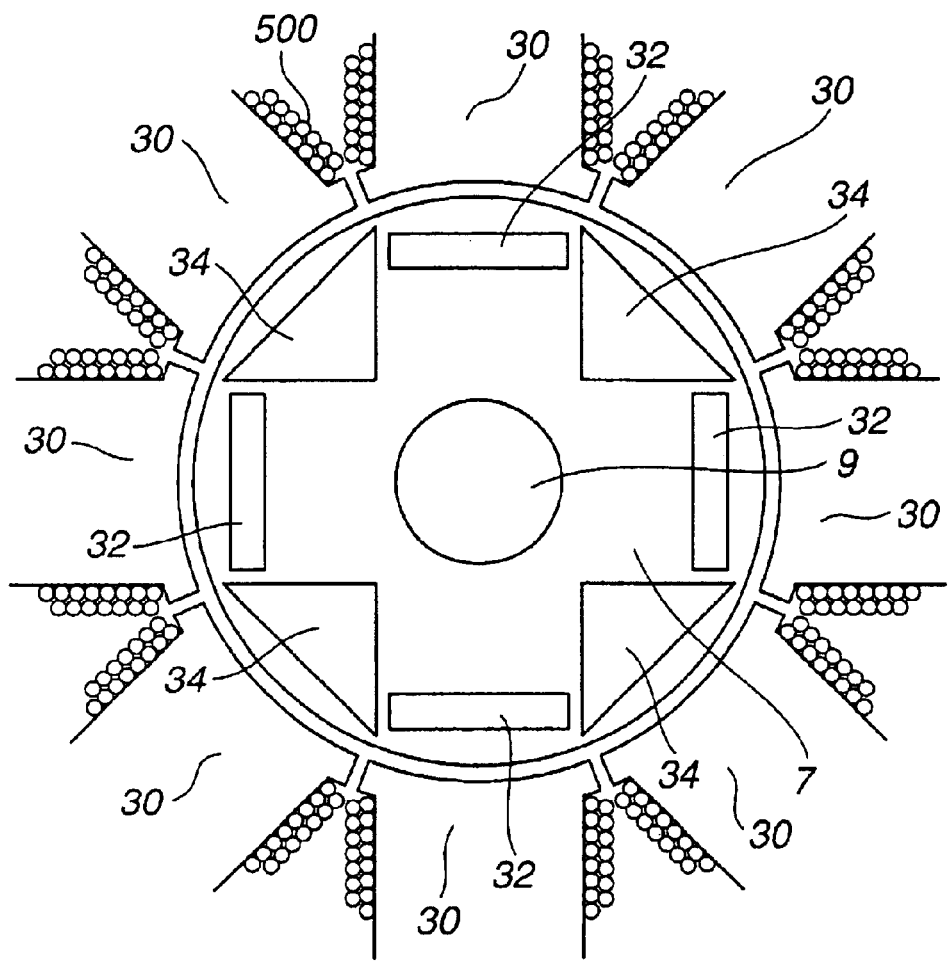
FIG. 7 is a cross sectional view of the electrical rotating machine representing a second preferred embodiment of an electrical rotating machine according to the present invention.

FIG. 7 shows a cross sectional view of the electrical rotating machine representing a second preferred embodiment according to the present invention. In this embodiment, a plurality of triangular aerial gaps 34 are provided on portions of inner rotor 7 except magnet buried portions, as shown in FIG. 7. The structures of stator 1 and outer rotor 8 are the same as those in the first embodiment shown in FIG. 5. Each aerial gap 34 has the same magnetic characteristic as each recess portion 33 in the first embodiment shown in FIG. 5. Each aerial gap 34 as viewed from the stator has the high magnetic resistance due to the presence of the air. As the result of this, inductance $L_q$ is decreased. The forward saliency characteristic for inner rotor 7 is realized. In this case, in addition to the advantage in the first embodiment, since no convex-and-recess portion is provided on the inner rotor surface as compared with the first embodiment shown in FIGS. 5 and 6, the outer rotor magnetic path can pass the rotor surface having the forward saliency characteristic. Consequently, the inductance of outer rotor 8 can be improved.

Figure 8:
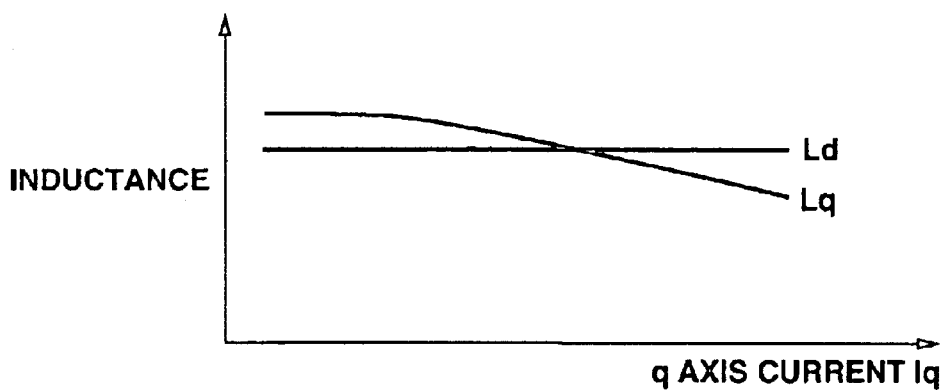
FIG. 8 is a characteristic graph representing a relationship between q-axis inductance and q-axis current for helping an explanation of an electrical rotating machine in a third preferred embodiment according to the present invention.

FIG. 8 shows a graph representing a relationship between q-axis inductance and q-axis current.

As appreciated from FIG. 8, q-axis inductance is largely varied according to a magnitude of q-axis current.

Hence, in the rotating machine in a third preferred embodiment, inductance $L_q$ may be designed to be saturated under the current condition that the forward saliency characteristic is desired (refer to FIG. 3). In this case, since, as the rotor structure, neither the air gaps nor convex-and-recess portion as described above is needed to be formed, the structure of the rotors becomes simpler. In the third embodiment, the forward saliency characteristic rotor can be obtained by saturating the q-axis inductance by means of the q-axis current In general, the q-axis inductance has the saturation characteristic in accordance with the q-axis current. Hence, the q-axis inductance is previously saturated. That is to say, if the q-axis current value is previously measured which decreases the q-axis inductance to a desired value, the forward saliency characteristic for one of the rotors can be obtained at a region that the designer has intended.

Figure 9:
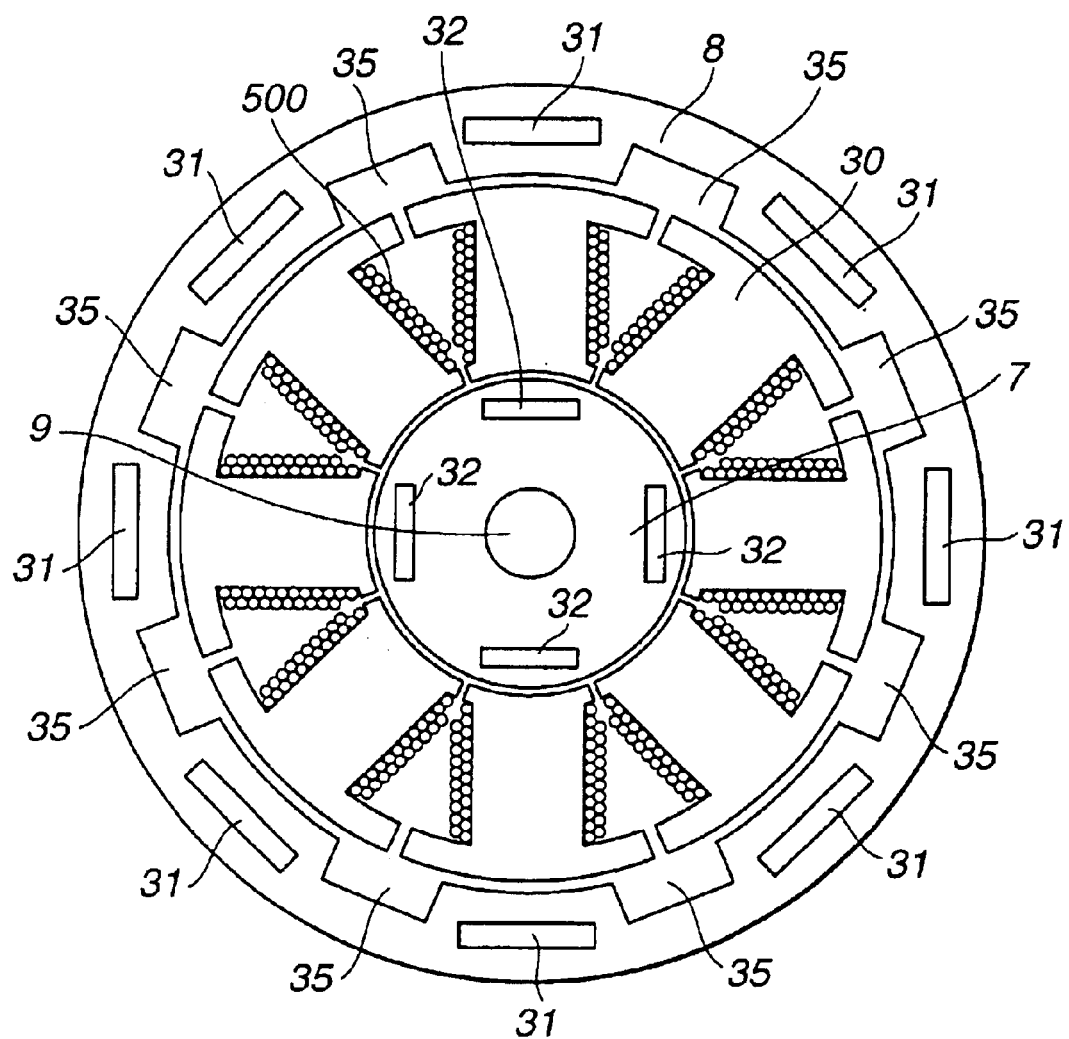
FIG. 9 is a cross sectional view of the electrical rotating machine representing a fourth preferred embodiment of the rotating machine according to the present invention.

FIG. 9 shows a cross sectional view of the electrical rotating machine in a fourth preferred embodiment according to the present invention. In the fourth embodiment, inner rotor 7 exhibits the reverse saliency characteristic and outer rotor 8 exhibits the forward saliency characteristic. Hence, as shown in FIG. 9, a recess portion 35 is provided for outer rotor 8 to form the convex-and-recess structure. In the same way as the forward saliency characteristic of inner rotor 7 as described in each of the first and second embodiment, the forward saliency characteristic of outer rotor 8 may be achieved by the air gap or the saturation.

According to the rotating machine according to the present invention, one of the two rotors exhibits the forward saliency characteristic and the other rotor exhibits the reverse saliency characteristic. Hence, q-axis inductance of the forward saliency characteristic rotor is reduced and d-axis inductance is raised. Then, a field-weakening current can be reduced. The whole interlinkage magnetic flux on the stator can be reduced. Thus, the miniaturization of the whole electrical rotating machine is made possible. In addition, if the cross sectional area of the stator is enlarged, the field-weakening current is reduced so that an extra current is added to a torque current. Thus, the reduction of the magnet quantity can be achieved. Furthermore, the other rotor exhibits the reverse saliency characteristic, the reluctance torque can be utilized. At the same magnet quantity, the large torque can be achieved. At the same torque, the magnet quantity can be reduced. In other words, as compared with the case where both rotors exhibit the reverse saliency characteristics, the miniaturization of the stator becomes possible even if the same magnet quantity is needed. If the stator is the same, the reduction of the magnet quantity can be achieved. It is noted that the compound current is supplied from an inverter to stator coils as described in a U.S. Pat. No. 6,049,152 issued on Apr. 11, 2000 (the disclosure of which is herein incorporated by reference).

The entire contents of a Japanese Patent Application No. 2002-098636 (filed in Japan on Apr. 1, 2002) are herein incorporated by reference.

Various modifications and variations of the embodiments described above will occur to those skilled in the art in the light of the above teachings. The scope of the invention is defined with reference to the following claims.

Industrial Applicability

The present invention is applicable to an electrical rotating machine having two rotors arranged on the same axis of rotation, associated with a single stator, and driven independently by means of a compound alternating current. Either of inner or outer rotor exhibits a forward saliency characteristic and the other rotor exhibits a reverse saliency characteristic. Hence, a q-axis inductance of the forward saliency characteristic rotor is reduced and a d-axis inductance is raised. Then, a field-weakening current can be reduced. A whole interlinkage magnetic flux on the stator can be reduced. Thus, a miniaturization of the whole electrical rotating machine is possible. In addition, if a cross sectional area of the stator is enlarged, a field-weakening current is reduced so that an extra current is added to a torque current. Thus, a reduction of a magnet quantity can be achieved. Furthermore, since the other rotor exhibits the reverse saliency characteristic, a reluctance torque can be utilized. The same magnet quantity is obtained with the large torque. At the same torque, the magnet quantity can be reduced. In other words, as compared with the case where both rotors exhibit the saliency characteristics, the miniaturization of the stator becomes possible even if the same magnet quantity is needed. If the stator is the same, a reduction in the magnet quantity can be achieved.

What is claimed is:

1. An electrical rotating machine, comprising:
   at least two rotors, each of the rotors having a plurality of permanent magnets along its circumferential direction thereof and arranged coaxially with the other rotor and being driven by means of a compound current supplied to stator coils; and
   a single stator having a plurality of stator coils through which the compound current is caused to flow, one of the rotors exhibiting a forward saliency characteristic and the other rotor exhibiting a reverse saliency characteristic.

2. An electrical rotating machine as claimed in claim 1, wherein, in one of the rotors exhibiting the forward saliency characteristic, a plurality of convex and recess portions are formed on every portion of the forward saliency characteristic exhibiting rotor in the circumferential direction thereof and the permanent magnets are arranged on respective convex portions thereof.

3. An electrical rotating machine as claimed in claim 1, wherein an aerial gap is provided on portions of the forward saliency characteristic rotor between the plurality of permanent magnets.

4. An electrical rotating machine as claimed in claim 1, wherein the rotating machine is driven in such a manner that the q-axis current related to the one rotor having the forward saliency characteristic is driven over a range such that the q-axis current is saturated by q-axis inductance and q-axis inductance is lowered than d-axis inductance of the one rotor having the forward saliency characteristic.

5. An electrical rotating machine as claimed in claim 1, wherein the rotors comprise an inner rotor located at an inside of the stator and an outer rotor located at an outside of the stator, the inner rotor having the reverse saliency characteristic and the outer rotor having the forward saliency characteristic.

6. An electrical rotating machine as claimed in claim 1, wherein the rotors comprise an inner rotor located at an inside of the stator and an outer rotor located at an outside of the stator, the inner rotor having the forward saliency characteristic and the outer rotor having the reverse saliency characteristic.

7. An electrical rotating machine as claimed in claim 5, wherein the inner rotor is provided with a recess portion located in a q-axis direction and is provided with a convex portion on which each permanent magnet is buried located in a d-axis direction which is separated by 45° in a mechanical angle with respect to the d-axis direction for the inner rotor to exhibit the forward saliency characteristic.

8. An electrical rotating machine as claimed in claim 5, wherein the inner rotor is of a circular shape in cross section and is provided with a substantially triangular shaped space in cross section in a q-axis direction and each permanent magnet is buried into the inner rotor which is aside each of the triangular shaped space for the inner rotor to exhibit the forward saliency characteristic.

9. An electrical rotating machine as claimed in claim 4, wherein the forward saliency characteristic exhibiting rotor is designed to saturate a q-axis inductance $L_q$ when the following current condition is satisfied: a torque curve of the forward saliency characteristic exhibiting rotor with respect to a d-axis current has an intersecting point to a current curve representing a q-axis current with respect to the d-axis current and the intersecting point is within a magnetic flux ellipse of the stator expressed as: $\lambda=\sqrt{\lambda_d^2+\lambda_q^2}$, wherein and $\lambda_d=\phi_d+L_d i_d$ and $\lambda_q=L_q i_q$, $\lambda_d$ denotes a magnetic flux of the d-axis, $\lambda_q$ denotes a magnetic flux of the q-axis, $\phi_d$ denotes a non-load magnetic flux of the forward saliency characteristic exhibiting rotor, $L_d$ denotes a d-axis inductance, $L_q$ denotes a q-axis inductance, $i_d$ denotes the d-axis current, and $i_q$ denotes the q-axis current.

10. An electrical rotating machine as claimed in claim 6, wherein the outer rotor has recess portions between the plurality of permanent magnets buried into an interior of the outer rotor which are faced with each stator piece for the outer rotor to exhibit the saliency characteristic.

11. A method applicable to an electrical rotating machine, the electrical machine comprising: at least two rotors, each rotor having a plurality of permanent magnets along its circumferential direction thereof, arranged coaxially with the other rotor, and being driven by means of a compound current supplied to stator coils; and a single stator having a plurality of stator coils through which the compound current is caused to flow, the method comprising: exhibiting a forward saliency characteristic for one of the rotors; and exhibiting a reverse saliency characteristic for the other rotor.

12. A method applicable to an electrical rotating machine as claimed in claim 11, wherein, to make the one rotor exhibit the forward saliency characteristic, the method further comprises forming plurality of convex and recess portions on every portion in the circumferential direction of the forward saliency characteristic rotor and arranging the permanent magnets on respective convex portions of the rotor.

13. A method applicable to an electrical rotating machine as claimed in claim 11, wherein the method comprises providing an aerial gap portions for the forward saliency characteristic rotor between the plurality of permanent magnets.

14. A method applicable to an electrical rotating machine as claimed in claim 11, wherein the method comprises driving the rotating machine in such a manner that a q-axis current related to the one rotor having the forward saliency characteristic is driven over a range such that the q-axis current is saturated by a q-axis inductance and the q-axis inductance is lowered than d-axis inductance of the one rotor having the forward saliency characteristic.

15. A method applicable to an electrical rotating machine as claimed in claim 11, wherein the rotors comprise an inner rotor located at an inside of the stator and an outer rotor located at an outside of the stator and wherein the inner rotor exhibits the reverse saliency characteristic and the outer rotor exhibits the forward saliency characteristic.

16. A method applicable to an electrical rotating machine as claimed in claim 11, wherein the rotors comprise an inner rotor located at an inside of the stator and an outer rotor located at an outside of the stator and wherein the inner rotor exhibits the forward saliency characteristic and the outer rotor exhibits the reverse saliency characteristic.

* * * * *